US012681306B2

(12) United States Patent
An et al.

(10) Patent No.: US 12,681,306 B2
(45) Date of Patent: Jul. 14, 2026

(54) COMBINED EYE AND ENVIRONMENT SENSING FOR A HEAD-MOUNTED DEVICE

(71) Applicant: Meta Platforms Technologies, LLC, Menlo Park, CA (US)

(72) Inventors: Yatong An, Redmond, WA (US); Zhaoyu Nie, Kenmore, WA (US); Youmin Wang, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 507 days.

(21) Appl. No.: 18/131,575

(22) Filed: Apr. 6, 2023

(65) Prior Publication Data

US 2024/0337840 A1 Oct. 10, 2024

(51) Int. Cl.
*G02B 27/01* (2006.01)

(52) U.S. Cl.
CPC .. *G02B 27/0172* (2013.01); *G02B 2027/0138* (2013.01); *G02B 2027/0178* (2013.01); *G02B 2027/0187* (2013.01)

(58) Field of Classification Search
CPC ........ G02B 27/0172; G02B 2027/0138; G02B 2027/0178; G02B 2027/0187; G02B 27/0093; G02B 27/017; G06V 40/19; G06F 3/013
See application file for complete search history.

(56) References Cited

U.S. PATENT DOCUMENTS

| | | | |
|---|---|---|---|
| 9,568,603 B2 | 2/2017 | Yahav et al. | |
| 11,190,748 B1 | 11/2021 | LeVake et al. | |
| 11,263,455 B2 | 3/2022 | Yi et al. | |
| 11,307,656 B2 | 4/2022 | Li et al. | |
| 2013/0050432 A1 | 2/2013 | Perez et al. | |
| 2016/0370605 A1* | 12/2016 | Ain-Kedem | G02C 7/083 |
| 2019/0317597 A1* | 10/2019 | Aleem | G06V 40/19 |
| 2022/0276351 A1 | 9/2022 | Ferreira et al. | |
| 2023/0043439 A1 | 2/2023 | Amirsolaimani | |

(Continued)

OTHER PUBLICATIONS

International Preliminary Report on Patentability for International Application No. PCT/US2024/018270, mailed Oct. 16, 2025, 11 pages.

(Continued)

*Primary Examiner* — Collin X Beatty

(74) *Attorney, Agent, or Firm* — Greenberg Traurig, LLP

(57) ABSTRACT

An eye and environment sensing system for a head-mounted device may be configured to determine changes in an eye orientation and range objects in the environment by sharing a common light source. The eye and environment sensing system includes a light source, a first photodetector, and a second photodetector. The light source is coupled to a frame of a head-mounted device and configured to provide a light beam to illuminate a portion of an eyebox region. The first photodetector is coupled to the frame and is oriented towards the eyebox region to receive reflections of the light beam from the eyebox region. The second photodetector is coupled to the frame and is oriented towards a scene side of the head-mounted device to receive reflections of the light beam from an environment of the head-mounted device. With a shared light source, battery consumption in the head-mounted device may be reduced.

10 Claims, 7 Drawing Sheets

(56)    References Cited

U.S. PATENT DOCUMENTS

2023/0067343 A1*   3/2023   Zhang ..................... H01Q 9/30
2024/0151966 A1*   5/2024   Meyer ............... G02B 27/0172

OTHER PUBLICATIONS

International Search Report and Written Opinion for International Application No. PCT/US2024/018270, mailed Jul. 3, 2024, 14 pages.

* cited by examiner

400

PROCESS FOR COMBINED EYE AND
ENVIRONMENT SENSING

COMBINED EYE AND ENVIRONMENT SENSING FOR A HEAD-MOUNTED DEVICE

TECHNICAL FIELD

This disclosure relates generally to optics and in particular to eye tracking technology.

BACKGROUND INFORMATION

Eye tracking technology enables head-mounted displays (HMDs) to interact with users based on the users' eye movement or eye orientation. Environment sensing enables HMDs to further enhance a user's artificial reality experience based on surrounding objects. However, operating independent eye tracking systems and environment sensing systems in an HMD can be detrimental to battery life, can be bulky, and can be heavy.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
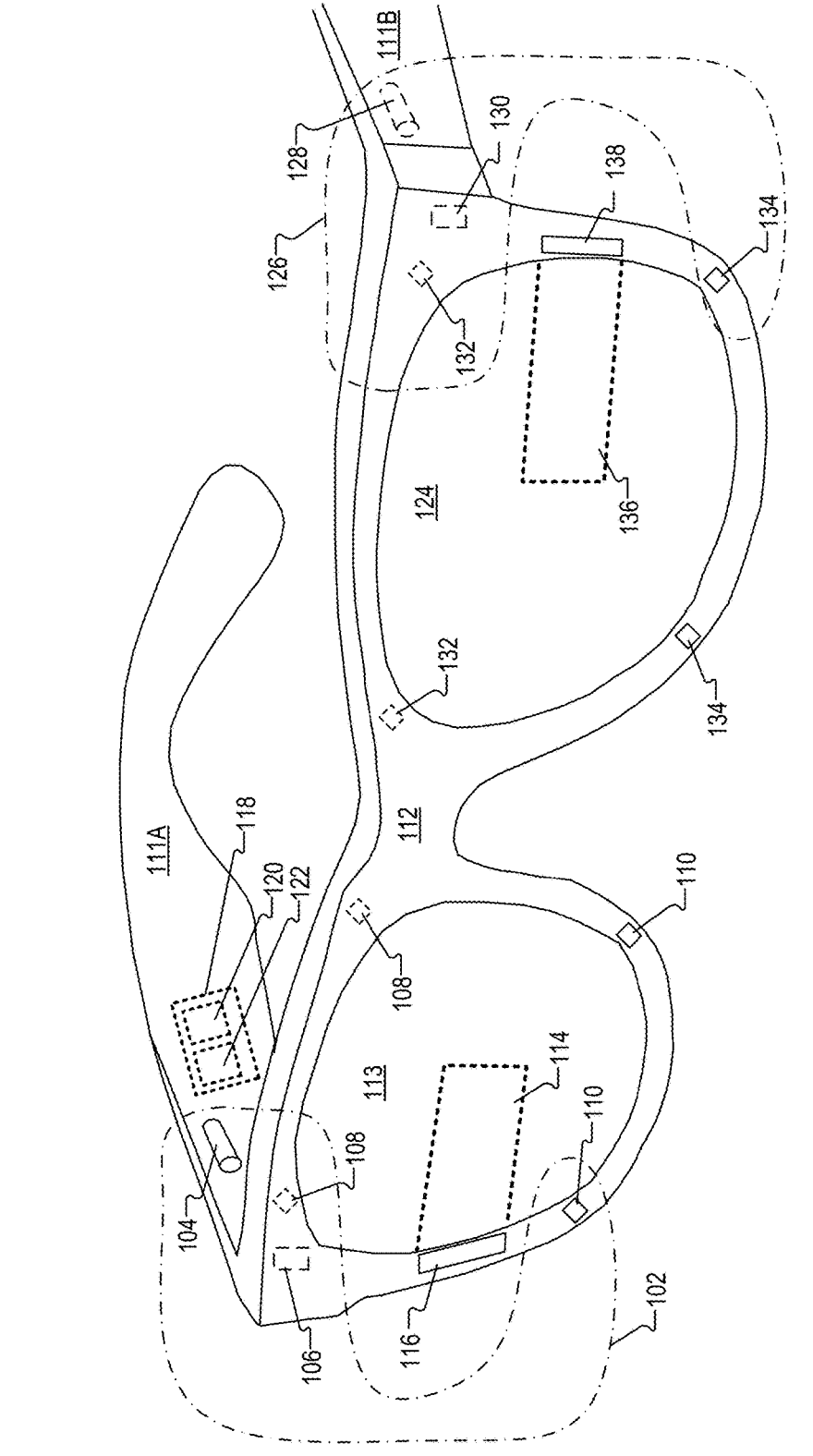
FIG. 1 illustrates a diagram of a head-mounted device with a combined eye and environment sensing system, in accordance with aspects of the disclosure.

Embodiments of a combined eye and environment sensing system for a head-mounted device are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm to 700 nm. Non-visible light may be defined as light having wavelengths that are outside the visible light range, such as ultraviolet light and infrared light. In aspects of this disclosure, red light may be defined as having a wavelength range of approximately 620 to 750 nm, green light may be defined as having a wavelength range of approximately 495 to 570 nm, and blue light may be defined as having a wavelength range of approximately 450 to 495 nm.

Eye tracking functionality expands the services and quality of interaction that a head-mounted device can provide to users. Sensing objects in the operating environment of a head-mounted device may further advance the feature-set that can be provided to a user. In virtual reality (VR) and artificial reality (AR) applications, three-dimensional (3D) sensing can be an advantageous technology, especially for eye tracking and operating environment ranging. Currently, eye tracking and surrounding sensing are two separate systems, which increases power consumption, occupies more space (e.g., larger size), and weighs more than if resources were combined and shared between the two sensing systems. The disclosed eye and environment sensing system combines eye tracking and surrounding 3D sensing together.

An eye and environment sensing system for a head-mounted device may be configured to determine changes in an eye orientation and may be configured to range objects in the environment by sharing a common light source (e.g., laser). The eye and environment sensing system includes a light source, a micro-electromechanical systems (MEMS) mirror, an eye-oriented photodetector, and a scene-oriented photodetector. The light source is coupled to a frame of a head-mounted device and configured to provide a light beam to illuminate a portion of an eyebox region. The MEMS mirror may receive the light beam from the light source and redirect the light beam into the eyebox region. The MEMS mirror may be configured to scan a portion of the eyebox region by changing the target location of the light beam within the eyebox region. The eye-oriented photodetector is coupled to the frame and is oriented towards the eyebox region to receive reflections of the light beam from the eyebox region. The reflections of the light beams also propagate through the lens assembly and into the operating/surrounding environment of the head-mounted device. The scene-oriented photodetector is coupled to the frame and is oriented towards a scene side of the head-mounted device to receive reflections of the light beam from one or more objects in the environment of the head-mounted device. For the scene-oriented photodetector, the light path of the light beam may include: light source to MEMS mirror to eyebox region (e.g., user's eye) to object in environment (through the lens assembly) to scene-oriented photodetector, for example. With a shared light source and scanning mechanism (e.g., MEMS mirror), battery consumption, sensing system size, and sensing system weight in the head-mounted device may be reduced.

The head-mounted device may include processing logic (e.g., within a controller) that is coupled to the eye-oriented and scene-oriented photodetectors. The processing logic may receive and use detection data from the eye-oriented photodetector to perform 3D reconstruction of the eye and/or to determine an orientation of the eye. The processing logic may receive and use detection data from the scene-oriented photodetector to perform 3D reconstruction of part of the operating/surrounding environment and/or to range one or more objects in the environment. The processing logic may filter undesirable light from the photodetectors with two shutter windows. A first shutter window defines the duration of time that light beam detection is permitted for the eye-oriented photodetector to reduce detection of ambient light. A second shutter window defines the duration of time that light beam detection is permitted for the scene-oriented photodetector from the environment to range one or more objects. The second shutter window of time may be offset or delayed from the first shutter window. The processing logic may send control signals to the MEMS mirror to cause the MEMS mirror to scan the eyebox region and environment.

The apparatus, system, and method for a combined eye and environment sensing system for a head-mounted device described in this disclosure may enable improvements in eye tracking technologies, for example, to support operations of a head-mounted device. These and other embodiments are described in more detail in connection with FIGS. 1-5.

FIG. 1 illustrates an example diagram of a head-mounted device 100 with an eye and environment sensing system 102, in accordance with aspects of the disclosure. Eye and environment sensing system 102 is configured to determine the distance (or range) to aspects (e.g., the cornea) of an eye of a user as well as the distance to one or more objects in the environment. Eye and environment sensing system 102 shares a light source (e.g., a laser) and scanning mechanism between the eye and environment sensing operations to reduce the power consumption, size, and weight of the combined system. A head-mounted device, such as head-mounted device 100, is one type of smart device. In some contexts, head-mounted device 100 is also a head-mounted display (HMD) that is configured to provide artificial reality. Artificial reality is a form of reality that has been adjusted in some manner before presentation to the user, which may include, e.g., virtual reality (VR), augmented reality (AR), mixed reality (MR), hybrid reality, or some combination and/or derivative thereof. Eye and environment sensing system 102 includes a light source 104, a MEMS mirror 106, a photodetector 108, and a photodetector 110 coupled to a frame 112 of head-mounted device 100, in accordance with aspects of the disclosure.

Light source 104 is configured to both illuminate a portion of the eyebox region (e.g., an eye of a user) and illuminate a portion of the operating/surrounding environment of head-mounted device 100, according to an embodiment. Light source 104 may be positioned at one or more of a variety of locations on frame 112 (e.g., on arm 111A). In one embodiment, light source 104 is coupled to arm 111A and is oriented to emit the light beam towards frame 112. Light source 104 may be configured to selectively (e.g., with pulses) illuminate the eyebox region with, for example, non-visible spectrum light (e.g., near infrared light). Using non-visible light may assist light source 104 to operate without significantly disturbing a user. Light source 104 may be implemented as one or more of a vertical cavity surface emitting laser (VCSEL), a superluminescent diode (SLED), an edge emitting light emitting diode (LED), a photonic integrated circuit (PIC) based illuminator, some other type of laser, or some of other type of LED. Light source 104 may be oriented to directly illuminate the eyebox region or may be oriented towards MEMS mirror 106 to indirectly illuminate the eyebox region, according to various embodiments.

MEMS mirror 106 is configured to receive a light beam from light source 104 and redirect the light beam towards the eyebox region to illuminate an eye of a user, in accordance with aspects of the disclosure. MEMS mirror 106 is coupled to frame 112, according to an embodiment. MEMS mirror 106 may be configured to operate in reflection or in diffraction. MEMS mirror 106 may have a reflective surface that can be tilted or distorted to redirect the light beam. MEMS mirror 106 may have a diffractive surface that uses optical elements to diffract light towards various locations in the eyebox region.

Photodetectors 108 and 110 may be coupled to frame 112 and may be configured to detect reflections of the light beam from the eye and the environment. Photodetectors 108 and 110 may be configured to detect the presence, intensity, and/or direction of light beam reflections. Photodetectors 108 and 110 may include a filter (e.g., bandpass) to filter out unwanted (e.g., visible spectrum) light. Photodetectors 108 and 110 may be configured to detect non-visible (e.g., near infrared) light. Photodetectors 108 and 110 may be implemented as photodiodes. Photodetectors 108 and 110 may be implemented as a p-n photodiode, a p-i-n photodiode, a Schottky type photodiode, and/or an avalanche photodiode, for example. Photodetector 108 is positioned on an eye side (e.g., inward facing) of frame 112 to detect reflections from the eyebox region. Head-mounted device may include a single photodetector 108 or a number of photodetectors 108 positioned at different locations on frame 112 to expand the angles from which light beam reflections may be detected. Photodetector 110 is positioned on a scene side (e.g., outward facing) of frame 112 to detect reflections from the environment that head-mounted device 100 is operated in. Head-mounted device may include a single photodetector 110 or may include a number of photodetectors 110 positioned at different locations on frame 112 to expand the angles from which light beam reflections may be detected.

Head-mounted device 100 may be configured to use one or more shutter windows to detect light beam pulses with photodetectors 108 and 110, in accordance with aspects of the disclosure. To increase the signal-to-noise ratio (SNR) and reduce the likelihood of detecting unintended light beams, photodetectors 108 and 110 may be operated, read, or configured to detect light within one or more shutter windows. For example, photodetector 108 may be configured to detect light during a first shutter window that accounts for the time that a light beam takes to travel from light source 104, to MEMS mirror 106, to an eye of a user, and back to photodetector 108. As another example, photodetector 110 may be configured to detect light during a second shutter window that accounts for the time that a light beam takes to travel from light source 104, to MEMS mirror 106, to an eye of a user, through lens assembly 113, to an object in the environment, and back to photodetector 110. The first and second shutter windows may have a delay between them, the first and second shutter windows may be combined, or the first and second shutter windows may be dynamically adjusted by head-mounted device 100 based on the detected light beam reflections, for example. An example timing diagram of the shutter windows in shown in FIG. 3 and described hereafter.

Head-mounted device 100 may be configured to provide visual information to a user with lens assembly 113. Lens assembly 113 is coupled or mounted to frame 112, for example, around a periphery of lens assembly 113. Lens assembly 113 may include a prescription optical layer matched to a particular user of head-mounted device 100 or may be non-prescription lens. Lens assembly 113 may include a number of optical layers, such as an illumination layer, a display layer (e.g., that includes a display), and/or a prescription layer, for example. The display layer may include a display 114 that may be implemented as a waveguide. Display 114 may be positioned in the field-of-view of a user to provide various user interface (UI) elements to the user. Display 114 may be driven by a projector 116 to provide information or UI elements that are based on the orientation of an eye of a user and/or based on one or more objects detected in the environment, according to an embodiment. Frame 112 may include or may be coupled to arms 111A and 111B for securing head-mounted device 100 to the head of a user. The illustrated head-mounted device 100 is configured to be worn on or about the head of a wearer of head-mounted device 100.

Head-mounted device 100 includes a controller 118 communicatively coupled to light source 104, MEMS mirror 106, photodiode(s) 108, and photodiode(s) 110, according to an embodiment. Controller 118 is configured to control the illumination timing of light source 104, according to an embodiment. Controller 118 may be configured to synchronize operation of light source 104 with shutter windows for photodetectors 108 and 110 to reduce noise while detecting light beam reflections from the eye and environment. Controller 118 is coupled to photodetectors 108 and 110 to receive detection data that is representative of the presence, intensity, and/or direction of detected light beam reflections, according to an embodiment. Controller 118 may include processing logic 120 and one or more memories 122 to analyze detection data and to perform 3D reconstruction of the eye and one or more objects in the environment. Based on the detection data, controller 118 may: determine an orientation of one or more of a user's eyes, perform one or more eye tracking operations, characterize (e.g., determine size, shape, and/or range) one or more objects in the environment, and/or display or provide user interface elements in display 114, according to an embodiment. Controller 118 may include a wired and/or wireless data interface for sending and receiving data, one or more graphic processors, and one or more memories 122 for storing data and computer-executable instructions. Controller 118 and/or processing logic 120 may include circuitry, logic, instructions stored in a machine-readable storage medium, ASIC circuitry, FPGA circuitry, and/or one or more processors. In one embodiment, head-mounted device 100 may be configured to receive wired power. In one embodiment, head-mounted device 100 is configured to be powered by one or more batteries. In one embodiment, head-mounted device 100 may be configured to receive wired data including video data via a wired communication channel. In one embodiment, head-mounted device 100 is configured to receive wireless data including video data via a wireless communication channel.

Controller 118 may determine ranges to the eye and to objects in the environment based on the time-of-flight (ToF) of light beam reflections, according to an embodiment. Changes of the distance between photodiode 108 and the eye may be used to determine a 3D reconstruction of the eye and determine an orientation of the eye. The distance to objects in the environment may be used to characterize the size, shape, and distance of each of the objects. ToF measurements may include indirect ToF (e.g., using phase changes of light beam reflections to determine distance) or may include direct ToF (e.g., using the duration of flight of light beam reflections to determine distance).

Head-mounted device 100 may be configured to perform similar operations on the left side (from a user's perspective) of frame 112 as on the right side. Head-mounted device 100 may include a lens assembly 124 and an eye and environment sensing system 126 that have similar features, characteristics, and/or operations as lens assembly 113 and eye and environment sensing system 102, according to an embodiment. Eye and environment sensing system 126 may include a light source 128, a MEMS mirror 130, photodetector(s) 132, and photodetector(s) 134. Lens assembly 124 may include a display 136 driven by a projector 138, for example.

Figure 2A:
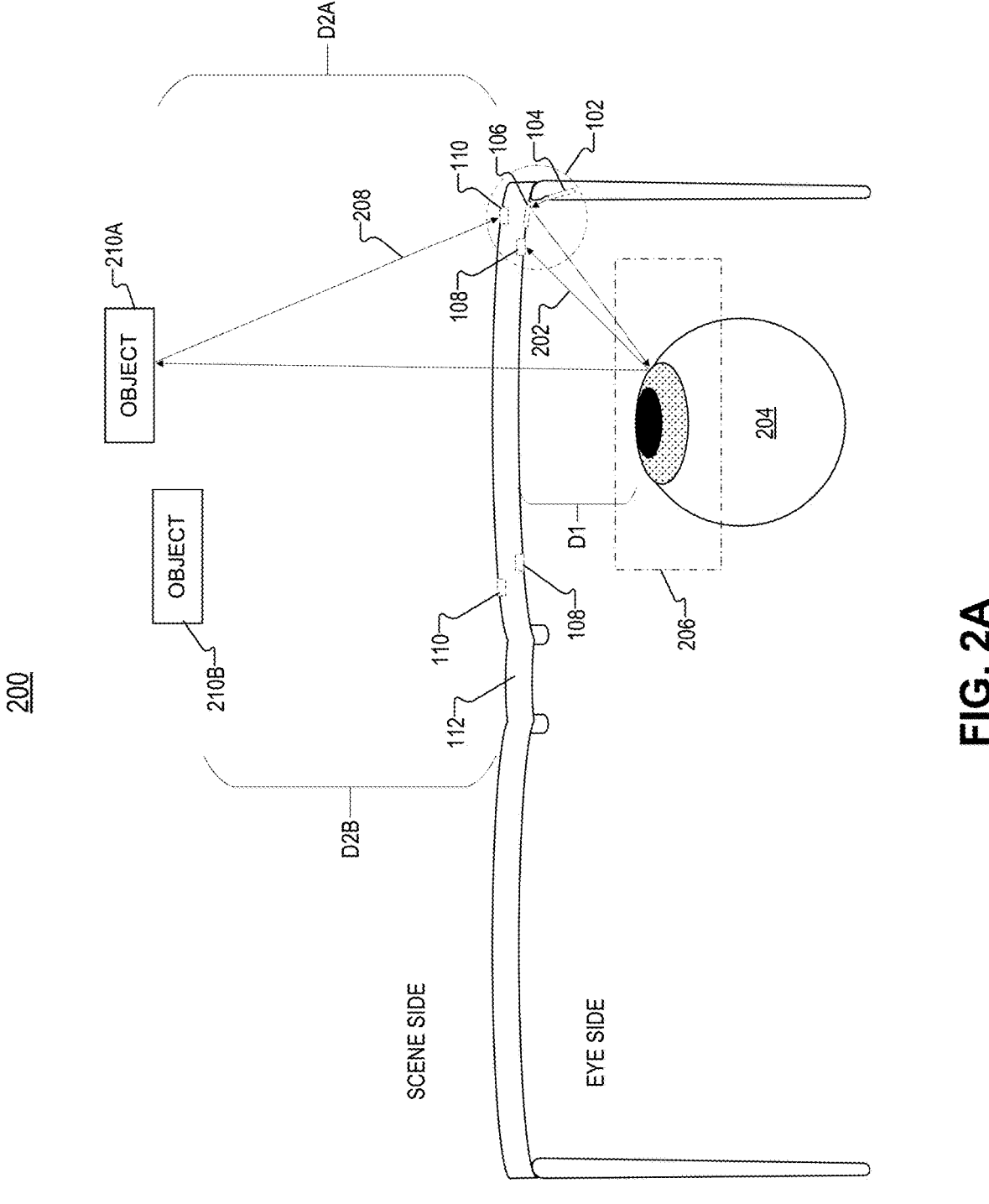
FIGS. 2A, 2B, and 2C illustrate diagrams of light paths for a combined eye and environment sensing system of a head-mounted device, in accordance with aspects of the disclosure.
Figure 2B:
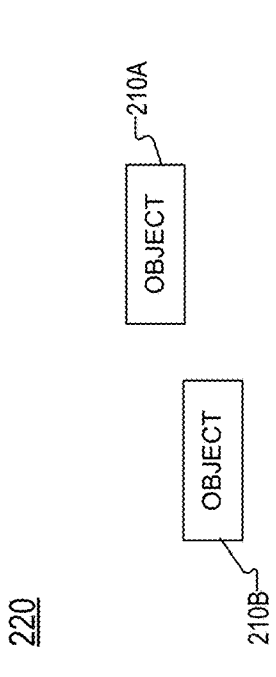
Figure 2B:
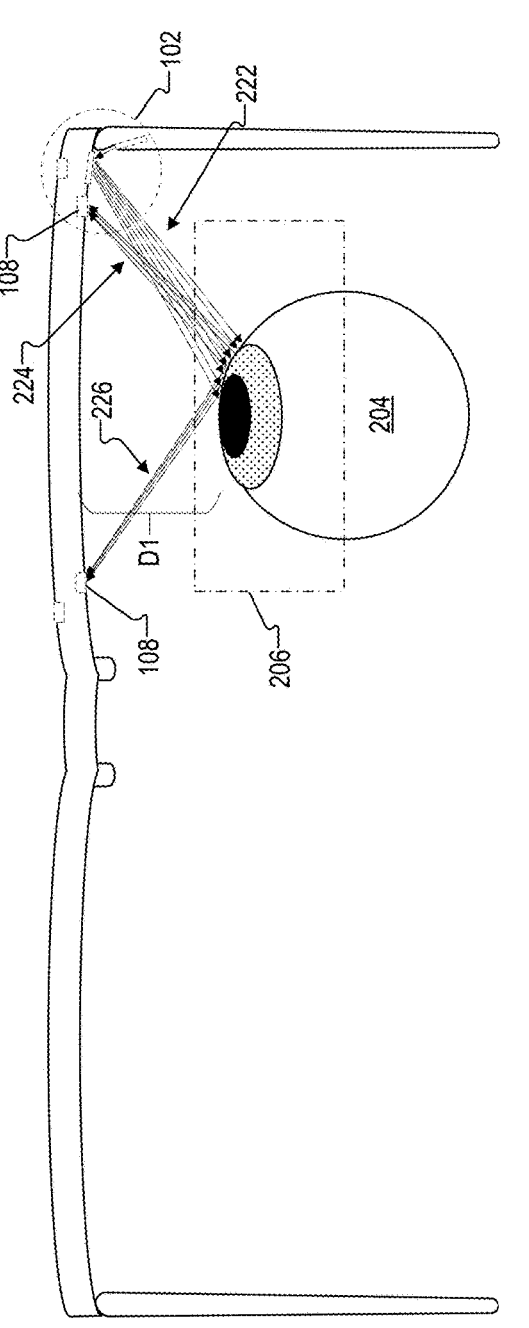
Figure 2C:
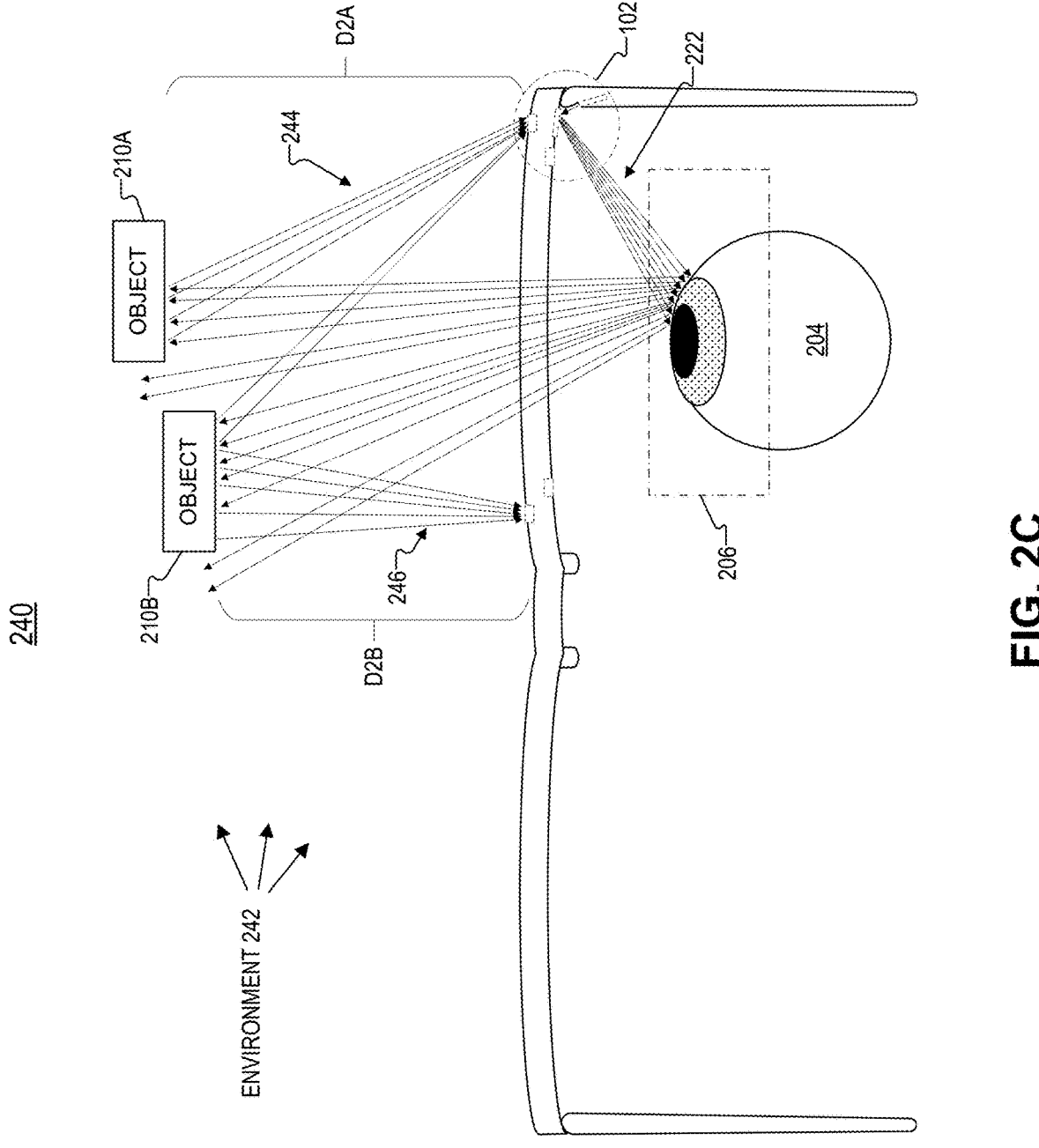

FIGS. 2A, 2B, and 2C illustrate diagrams of light paths for a combined eye and environment sensing system of a head-mounted device, in accordance with aspects of the disclosure. FIG. 2A illustrates a light path diagram 200 for head-mounted device 100, in accordance with aspects of the disclosure.

Diagram 200 includes a light path 202 that includes light beam reflection off of an eye 204 that is located within an eyebox region 206, according to an embodiment. Eye 204 or eyebox region 206 may be a distance D1 from frame 112. Distance D1 may be 10-20 mm based on a user's face structure and slippage of frame 112. The light beam emitted by light source 104 may complete light path 202 in tens of picoseconds, and a shutter window for photodetector 108 may be configured to detect a light beam in that time frame.

Diagram 200 includes a light path 208 that includes light beam reflection off of one or more objects 210 that are located in an environment of operation of head-mounted device 100, according to an embodiment. One or more objects 210 (individually, object 210A and object 210B) may be positioned at example distances D2 (individually, distance D2A and distance D2B) from frame 112. Distances D2 may be a few meters (e.g., 2-3) or may be several meters (e.g., 10-20). The light beam emitted by light source 104 may travel light path 208 in a few or in tens of nanoseconds, and a (second) shutter window for photodetector 110 may be configured to detect a light beam returning in that time frame.

FIG. 2B illustrates a light path diagram 220 for head-mounted device 100 that shows example light paths from scanning a portion of eye 204 using MEMS mirror 106, in accordance with aspects of the disclosure. Diagram 220 includes an example light beam scan pattern 222 of light beam pulses that may be used to illuminate a portion of eye 204 and/or eyebox region 206, according to an embodiment. Diagram 220 includes light beam reflections 224 and 226 that are directed towards photodetectors 108, in response to light beam scan pattern 222, according to an embodiment.

FIG. 2C illustrates a light path diagram 240 for head-mounted device 100 that shows example light paths from scanning a portion of environment 242 using MEMS mirror 106 and eye 204, in accordance with aspects of the disclosure. Diagram 240 includes light beam scan pattern 222 of light beam pulses that may be used to illuminate a portion of environment 242 using reflections from eye 204 and/or eyebox region 206, according to an embodiment. Diagram 240 includes light beam reflections 244 and 246 captured or detected by photodetectors 110, in response to light beam scan pattern 222, according to an embodiment. In an embodiment, controller 118 may be configured to dynamically adjust the shutter window for photodetectors 110 based on detection data for one or more objects 210 from previous scans. For example, the shutter window may initially be set to span a range of 2-30 meters, but the shutter window may be adjusted to detect objects at 15-25 meters based off of detection data received from a previous scan.

Figure 3:
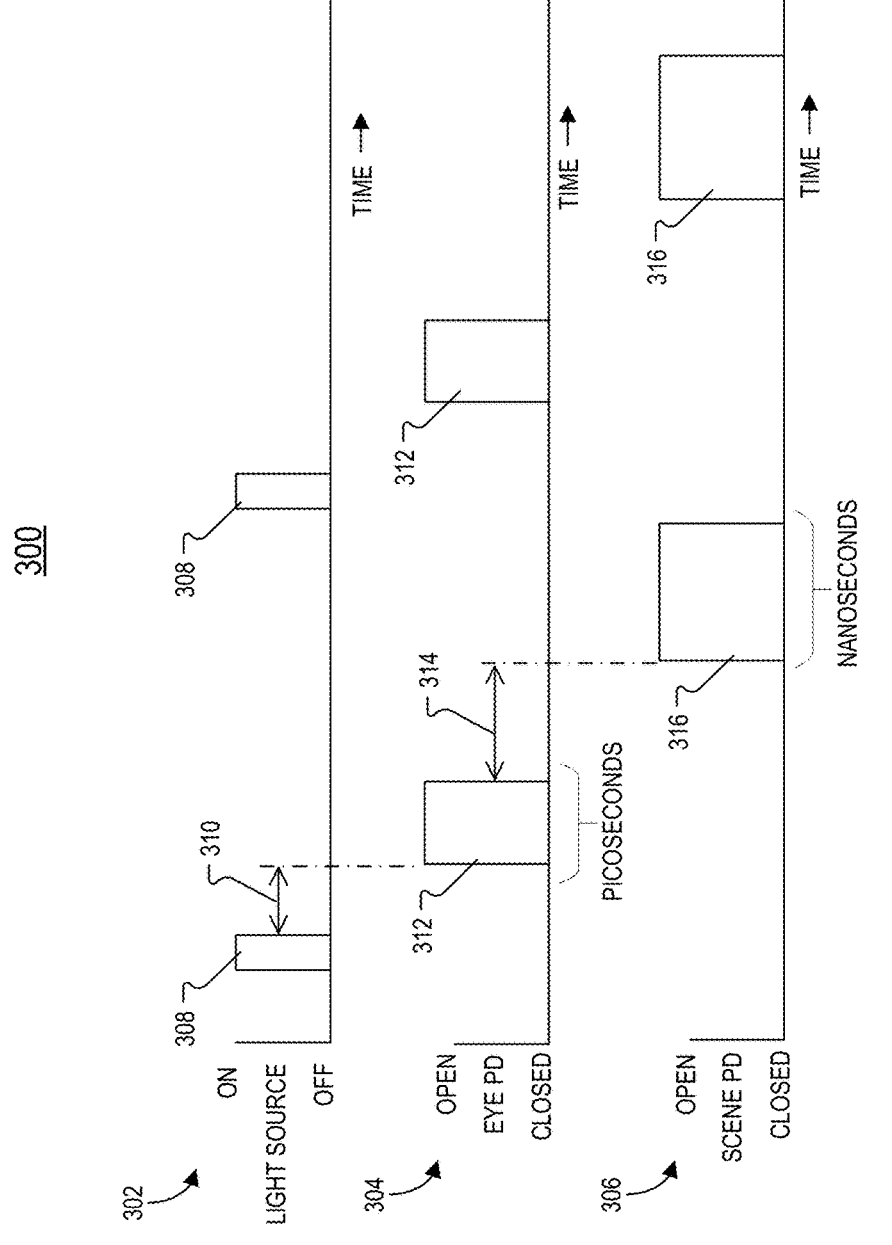
FIG. 3 illustrates timing diagrams for shutter windows for capturing light beam reflections with photodetectors, in accordance with aspects of the disclosure.

FIG. 3 illustrates timing diagrams 300 for shutter windows for capturing light beam reflections with photodetectors, in accordance with aspects of the disclosure. Timing diagrams 300 include a timing diagram 302, a timing diagram 304, and a timing diagram 306, according to an embodiment.

Timing diagram 302 illustrates laser pulse 308 that may be periodically emitted by the light source. The x-axis of timing diagram 302 may represent time, and the y-axis may represent light beam intensity (e.g., on/off). The controller may insert a time delay 310 between laser pulse 308 and a shutter window 312, according to an embodiment. In one embodiment, shutter window 312 may be opened before, during, or closely following laser pulse 308, due to the short distance of the light path between the eye and the eye-oriented photodetector.

Timing diagram 304 illustrates shutter window 312 that the controller may use to filter out unintended light signals from an eye-oriented photodetector (e.g., photodetector 108, shown in FIG. 1). The x-axis of timing diagram 304 may represent time, and the y-axis may represent the shutter window being open or closed. Shutter window 312 may be open for a duration that is on the order of tens of picoseconds, according to an embodiment. The controller may insert a time delay 314 between shutter window 312 and a shutter window 316, according to an embodiment. Time delay 314 may be a few nanoseconds to tens of nanoseconds in duration.

Timing diagram 306 illustrates shutter window 316 that the controller may use to filter out unintended light signals from scene-oriented photodetector (e.g., photodetector 110, shown in FIG. 1). The x-axis of timing diagram 304 may represent time, and the y-axis may represent the shutter window being open or closed. Shutter window 316 may be open for a duration that is on the order of a few to tens of nanoseconds to allow light to propagate into the environment and return to the photodetector, according to an embodiment. In one embodiment shutter windows 312 and 316 are combined into a single shutter window.

Figure 4:
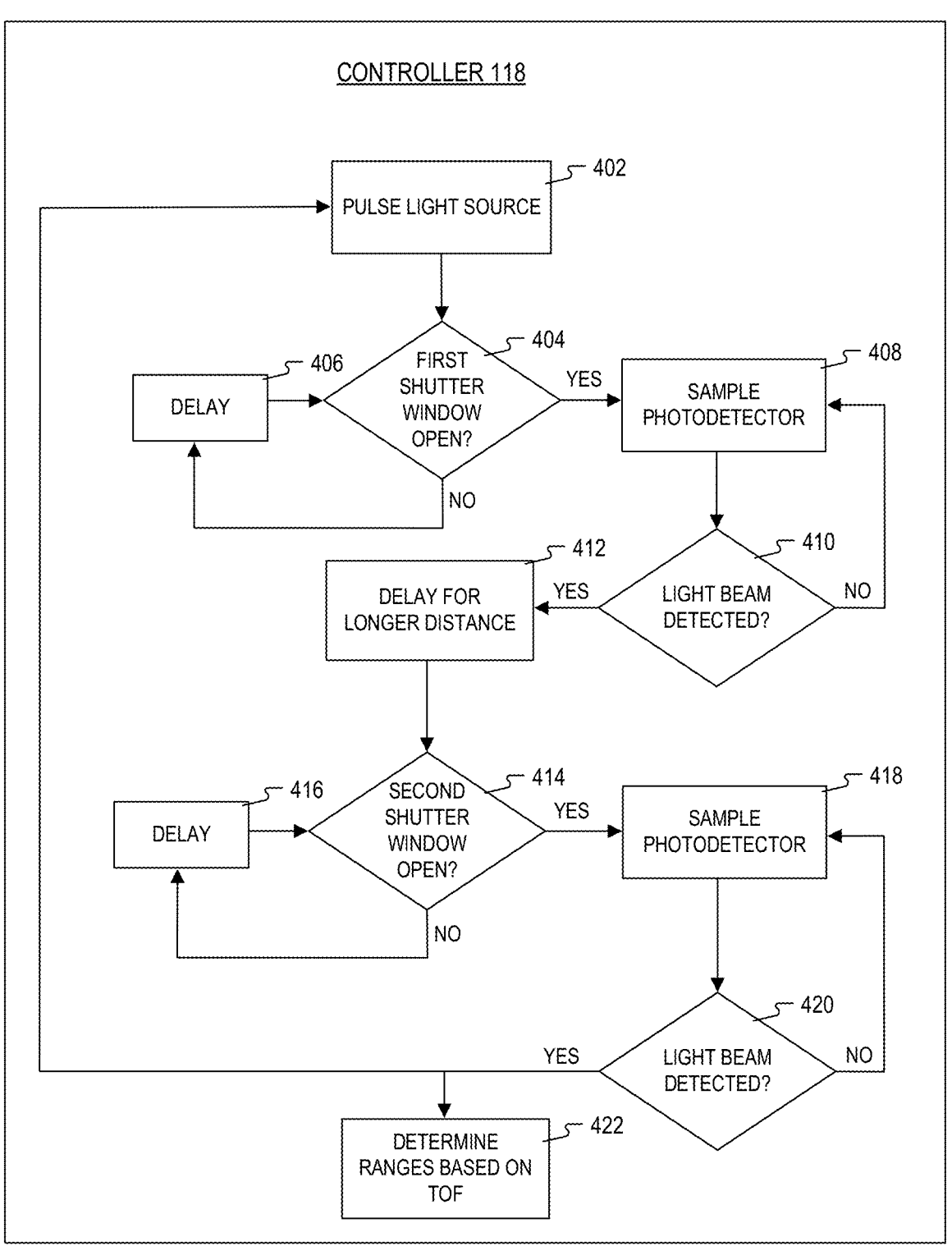
FIG. 4 illustrates a flow diagram of a process for combined eye and environment sensing with a controller of a head-mounted device, in accordance with aspects of the disclosure.

FIG. 4 illustrates a flow diagram of a process 400 for combined eye and environment sensing with controller 118 of head-mounted device 100, in accordance with aspects of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

At process block 402, process 400 pulses a light source, according to an embodiment. The duration of the pulse may have a duration that is on the order of a few picoseconds or tens of picoseconds. Process block 402 proceeds to process block 404, according to an embodiment.

At process block 404, process 400 determines if a first shutter window is open, according to an embodiment. If the first shutter window is not open, process block 404 proceeds to process block 406 for a delay prior to re-determining if the first shutter window is open, according to an embodiment. If the first shutter window is open (or does not exist), process block 404 proceeds to process block 408, according to an embodiment.

At process block 408, process 400 samples a (eye-oriented) photodetector, according to an embodiment. The eye-oriented photodetector may be coupled to a frame of a head-mounted device and may be oriented to receive light beam reflections from an eye of a user. Process block 408 proceeds to process block 410, according to an embodiment.

At process block 410, process 400 determines if a light beam reflection is detected, according to an embodiment. If a light beam reflection is not detected, process block 410 proceeds to process block 408 for re-sampling, according to an embodiment. If the light beam reflection is detected, process block 410 proceeds to process block 412, according to an embodiment. In one embodiment, controller 118 is configured to be responsive to an interrupt or interrupt pin, and the photodetector sends a signal to the interrupt pin when the light beam reflection is detected.

At process block 412, process 400 delays second shutter operations to allow light to travel between an object in the environment and a scene-oriented photodetector, according to an embodiment. The duration of the delay may have a duration that is on the order of a few nanoseconds or tens of nanoseconds. Process block 412 proceeds to process block 414, according to an embodiment.

At process block 414, process 400 determines if a second shutter window is open, according to an embodiment. If the second shutter window is not open, process block 414 proceeds to process block 416 for a delay prior to re-determining if the second shutter window is open, according to an embodiment. If the second shutter window is open, process block 414 proceeds to process block 418, according to an embodiment.

At process block 418, process 400 samples a (scene-oriented) photodetector, according to an embodiment. The scene-oriented photodetector may be coupled to the frame of the head-mounted device and may be oriented to receive light beam reflections from a scene or operating environment for the head-mounted device. Process block 418 proceeds to process block 420, according to an embodiment.

At process block 420, process 400 determines if a light beam reflection is detected (e.g., off of an object in the environment), according to an embodiment. If a light beam reflection is not detected, process block 420 proceeds to process block 418 for re-sampling, according to an embodiment. If the light beam reflection is detected, process block 420 returns to process block 402 and proceeds to process block 422, according to an embodiment. In one embodiment, controller 118 is configured to be responsive to an interrupt or interrupt pin, and the scene-oriented photodetector sends a signal to the interrupt pin when the light beam reflection is detected.

At process block 422, process 400 determines ranges to the eye and to objects in the environment based on the time-of-flight of light beam reflections. Changes in the distance to the eye may be used to perform 3D reconstruction of the eye and determine an orientation of the eye. Distances to objects in the environment may be used to characterize the size, shape, and distance of each of the objects. Time of flight measurements may include indirect ToF (e.g., using phase changes of light beam reflections to determine distance) or may include direct ToF (e.g., using the duration of flight of light beam reflections to determine distance).

Figure 5:
FIG. 5 illustrates a flow diagram of a process for combined eye and environment sensing with a head-mounted device, in accordance with aspects of the disclosure.
Figure 5:
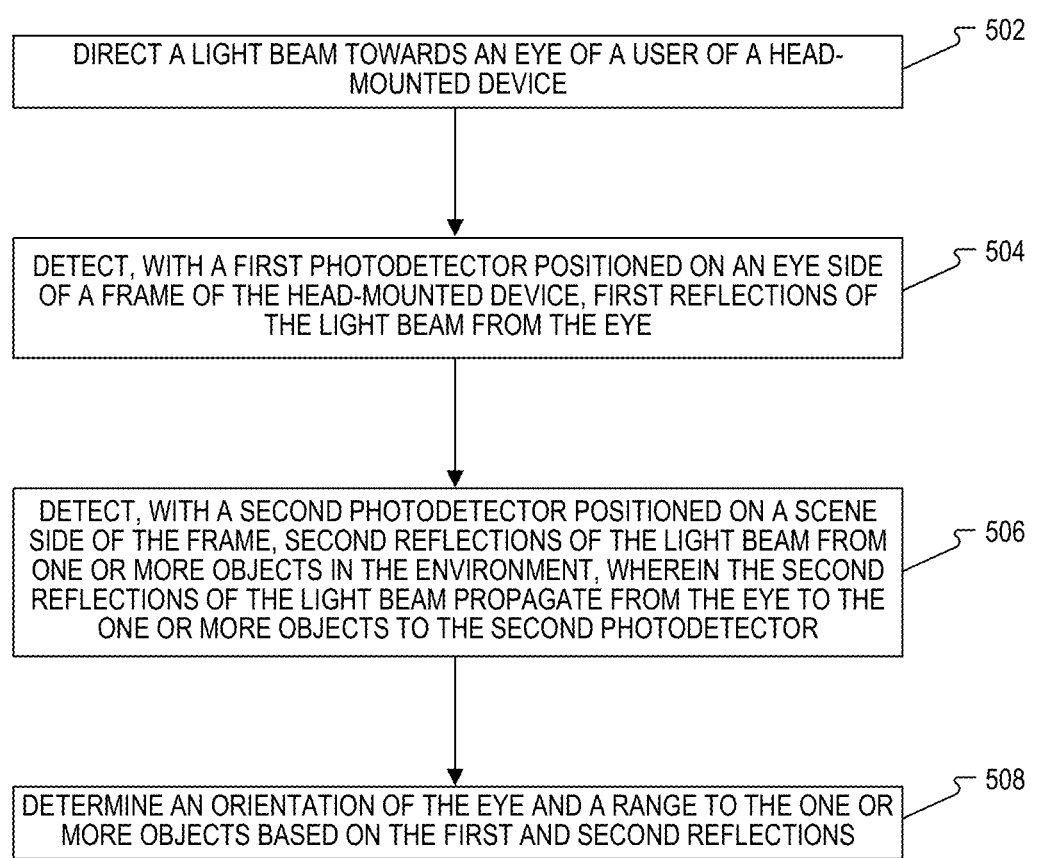

FIG. 5 illustrates a flow diagram of a process 500 of combined eye and environment sensing with a head-mounted device, in accordance with aspects of the disclosure. Process 500 may be at least partially incorporated into or performed by a head-mounted device (e.g., an HMD), according to an embodiment. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

At process block 502, process 500 includes directing a light beam towards an eye of a user of a head-mounted device, according to an embodiment. Directing light may include selectively pulsing the light source. Process block 502 proceeds to process block 504, according to an embodiment.

At process block 504, process 500 includes detecting, with a first photodetector positioned on an eye side of a frame of the head-mounted device, first reflections of the light beam from the eye, according to an embodiment. Process block 504 proceeds to process block 506, according to an embodiment.

At process block 506, process 500 includes detecting, with a second photodetector positioned on a scene side of the frame, second reflections of the light beam from one or more objects in the environment, wherein the second reflections of the light beam propagate from the eye to the one or more objects to the second photodetector, according to an embodiment. Process block 506 proceeds to process block 508, according to an embodiment.

At process block 508, process 500 includes determining an orientation of the eye and a range to the one or more objects based on the first and second reflections, according to an embodiment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g., 120) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., 122) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eye and environment sensing system for a head-mounted device comprising:

a light source coupled to a frame of a head-mounted device and configured to provide a light beam to illuminate a portion of an eyebox region;

a first photodetector coupled to the frame and oriented towards the eyebox region to receive reflections of the light beam from the eyebox region; and a second photodetector coupled to the frame and oriented towards a scene side of the head-mounted device to receive reflections of the light beam, after reflection of the light beam from the eyebox region, from an environment of the head-mounted device.

2. The eye and environment sensing system of claim 1, wherein the second photodetector is configured to detect the light beam along a light path, wherein the light path includes propagation from the eyebox region to an object in the environment and propagation from the object to the second photodetector.

3. The eye and environment sensing system of claim 1 further comprising:

a micro-electromechanical systems (MEMS) mirror coupled to the frame and configured to direct the light beam from the light source to the portion of the eyebox region.

4. The eye and environment sensing system of claim 3, wherein the MEMS mirror is configured to scan the portion of the eyebox region.

5. The eye and environment sensing system of claim 4 further comprising:

processing logic coupled to the first photodetector and configured to at least partially generate a three-dimensional (3D) model of the portion of the eyebox region.

6. The eye and environment sensing system of claim 1 further comprising:

a plurality of first photodetectors coupled to the frame and oriented towards the eyebox region, wherein the first photodetector is one of the plurality of first photodetectors.

7. The eye and environment sensing system of claim 1 further comprising:

a plurality of second photodetectors coupled to the frame and oriented towards the environment, wherein the second photodetector is one of a plurality of second photodetectors.

8. The eye and environment sensing system of claim 1 further comprising:

processing logic coupled to the first and second photodetectors, wherein the processing logic is configured to determine eye orientation and range to an object using time-of-flight (ToF) of the light beam.

9. The eye and environment sensing system of claim 8, wherein the processing logic is configured to determine the orientation and the range using direct ToF or indirect ToF.

10. The eye and environment sensing system of claim 1, wherein the first photodetector is configured to capture reflections from the eyebox region within a first shutter window, wherein the second photodetector is configured to capture reflections from the environment within a second shutter window, wherein the first and second shutter windows are separated by a time delay.

* * * * *